G. W. KITTERMAN.
VEHICLE WHEEL.
APPLICATION FILED NOV. 18, 1916.
1,246,756. Patented Nov. 13, 1917.
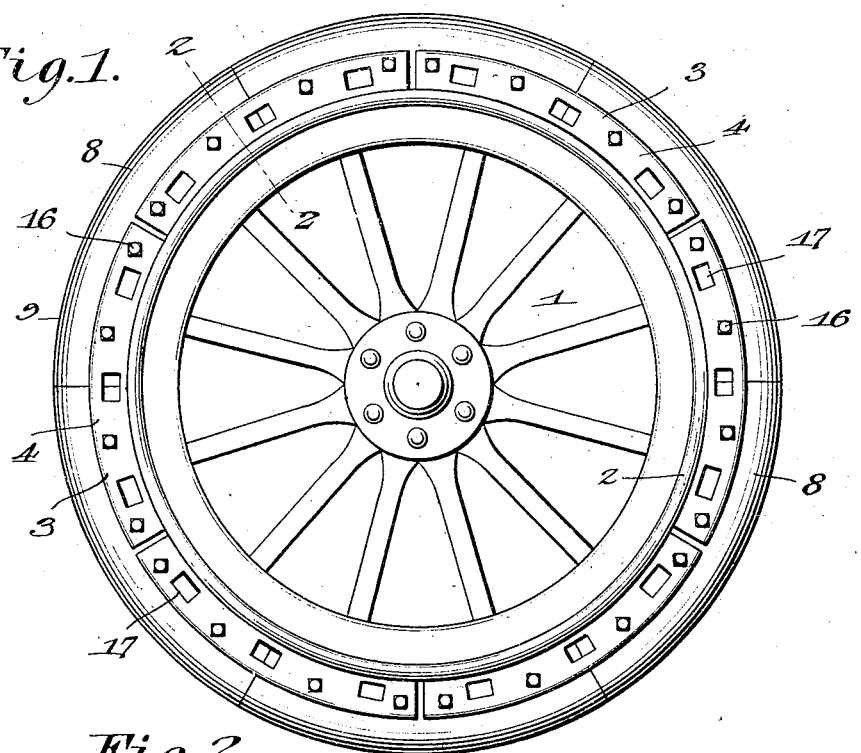
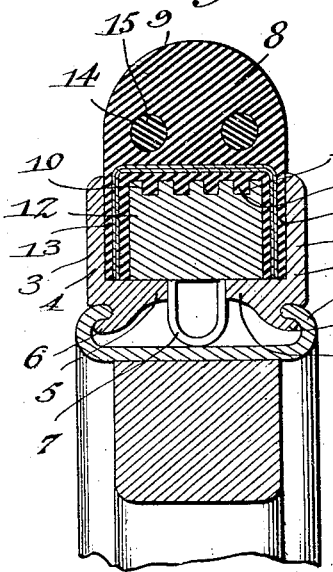
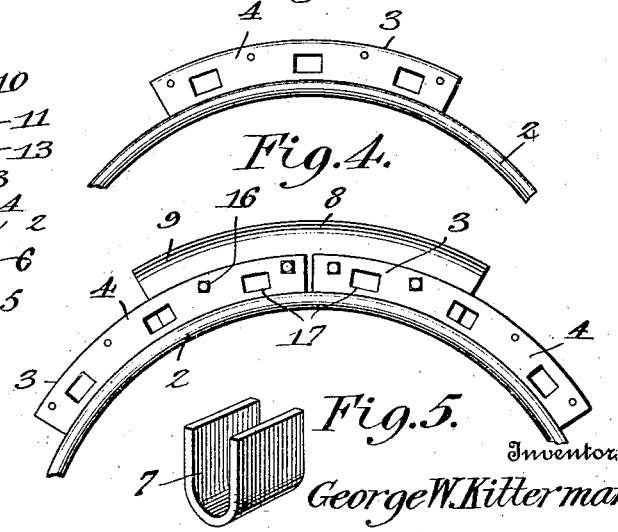
Inventor
George W. Kitterman.
By Victor J. Evans
Attorney
Witnesses

UNITED STATES PATENT OFFICE.

GEORGE WASHINGTON KITTERMAN, OF MUSKEGON HEIGHTS, MICHIGAN.

VEHICLE-WHEEL.

1,246,756. Specification of Letters Patent. Patented Nov. 13, 1917.

Application filed November 18, 1916. Serial No. 132,136.

*To all whom it may concern:*

Be it known that I, GEORGE WASHINGTON KITTERMAN, a citizen of the United States, residing at Muskegon Heights, in the county of Muskegon and State of Michigan, have invented new and useful Improvements in Vehicle-Wheels, of which the following is a specification.

This invention relates to vehicle wheels, and especially to a means for attaching sectional solid tires to the rim of a wheel.

The primary object of the invention is to provide a convenient means for attaching a sectional cushion tire to a vehicle wheel, whereby worn or injured sections of the tire may be easily removed and others substituted.

Another object of the invention is to provide a vehicle wheel with sectional tire attaching means, designed to hold a sectional solid tire to a vehicle wheel, in such a way as to convert them into a continuous rim and tire.

A further object of the invention is to provide a wheel of this class with a neat and attractive sectional solid tire, which may be manufactured and maintained at a small expense.

A still further object is to provide a novel means for holding the sectional tire attaching means in engagement with the rim, said means including spring spreaders positioned transversely of the rim and held between said rim and tire against radial movement.

With the above and other objects in view the invention consists of a vehicle wheel comprising a rim, sectional side irons, frictionally located within said rim by means of spreaders, a sectional solid tire seated within said irons and comprising a resilient tread vulcanized to a nonresilient filler, and bolts whereby the said irons and rim are converted into a continuous element.

In the drawings;

Figure 1 is a side elevation of a vehicle wheel having the invention applied thereto;

Fig. 2 is an enlarged cross sectional view on the line 2—2 of Fig. 1;

Fig. 3 is a detailed elevation of a portion of the rim having one section of the side irons in position;

Fig. 4 is a similar view with two sections of the side irons in position, and a section of the tire in place; and Fig. 5 is a detailed perspective view of one of the U-shaped spring spreaders.

In the practical embodiment of the invention there may be employed a vehicle wheel 1 of any preferred construction provided with a rim 2 which may be of the clencher, or any other type.

Secured within this rim are a number of sectional side irons, of the cross sectional shape shown in Fig. 2. These irons are designated by the numeral 3, and comprise side members 4, inwardly extending seats 5 and depending engaging flanges 6, the said flanges being of a shape to engage the wheel rim 2. The inwardly extending seats 5 are spaced apart for the reception of U-shaped spring spreaders 7 of substantially the shape shown in Fig. 5. These spreaders are driven into the spaces between the seats 5 and urge the flanges 6 into engagement with the rim 2 and securely hold the side irons in position.

Seated within the side irons, are the sectional members 8 forming the cushion tire. These sections comprise a resilient tread 9 provided with ribs 10, adapted to be received into grooves 11, formed in a non-resilient filler 12, which is vulcanized to the tread. This tread is provided with side flanges 13 so that the filler 12 may be covered upon three of its sides. The tread 9 is further formed with longitudinal openings 14 adapted to be provided with a soft rubber filling 15, to add to the resiliency of the tread. If desired a layer or layers of fabric may be embodied in the tread, and carried around the soft rubber filling 15, and down into the side flanges 13 to add to the strength and wearing qualities of the tire.

The joints between the sectional side irons, and the sectional tire are broken, and these sections are secured together by means of bolts 16, passing through registering apertures in the iron and tire sections. By this construction these irons and tire sections are converted into a continuous element. If desired rectangular or other openings 17 may be provided in the sectional side irons.

It will be seen that the above construction provides a cheap and efficient tire of a continuous character, at the same time permitting worn or injured sections to be removed and new ones replaced, without disturbing the rest of the tire.

Having described the invention, what I claim is;

1. A vehicle wheel comprising a rim, sectional side irons having an inter-engaging connection with said rim, spring spreaders for holding said side irons in position and a sectional tire for said rim.

2. A vehicle wheel comprising a rim, sectional side irons engageable with said rim, frictionally engaging resilient spreaders positioned transversely of said rim between the irons, to force them into engagement with the rim and a tire within said irons.

3. A vehicle wheel comprising a rim, sectional side irons engageable with said rim, a tire within said irons and spreaders positioned transversely of said rim between said irons to force them into engagement with the rim, said spreaders being positioned between and contacting said rim and tire to prevent any radial movement of said spreaders.

In testimony whereof I affix my signature.

GEORGE WASHINGTON KITTERMAN.

Copies of this patent may be obtained for five cents each, by addressing the "Commissioner of Patents, Washington, D. C."